United States Patent [19]

Aoshima et al.

[11] Patent Number: 4,731,629
[45] Date of Patent: Mar. 15, 1988

[54] CONTROL DEVICE FOR EXPOSURE-WITH-ZOOMING PHOTOGRAPHY

[75] Inventors: Chikara Aoshima, Kanagawa; Yasuhiko Shiomi, Tokyo, both of Japan

[73] Assignee: Canon Kabushiki Kaisha

[21] Appl. No.: 847,205

[22] Filed: Apr. 2, 1986

[30] Foreign Application Priority Data

Apr. 2, 1985 [JP] Japan .................................. 60-069740

[51] Int. Cl.[4] .............................................. G03B 3/10
[52] U.S. Cl. ...................................... 354/410; 354/266
[58] Field of Search ......................... 354/266, 410, 456

[56] References Cited

U.S. PATENT DOCUMENTS 4,284,336 8/1981 Iwata et al. ..................... 354/266 X Primary Examiner—Michael L. Gellner
Attorney, Agent, or Firm—Toren, McGeady & Associates

[57] ABSTRACT

In the camera having a zoom lens with an automatic operating mechanism therefor, a device for controlling co-ordination of the mechanism with a shutter, comprises an exposure-with-zooming actuator arranged upon first stroke to actuate the mechanism so that the zoom lens is set in one of the terminal ends of movement thereof, and upon second stroke to initiate a zooming operation of the zoom lens by the mechanism, and control means responsive to start of the zooming for initiating an exposure operation of the shutter to a photographic film.

20 Claims, 14 Drawing Figures

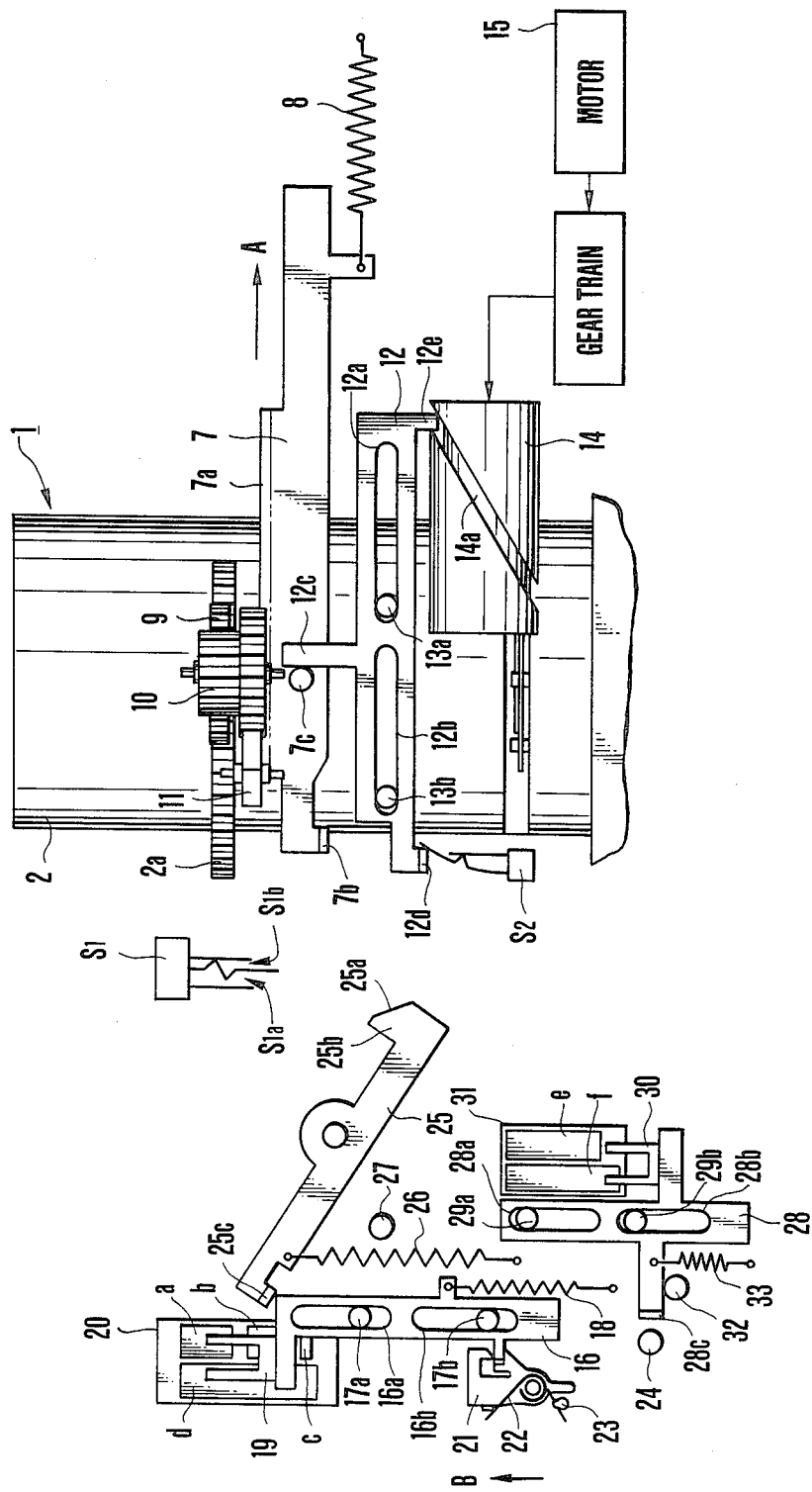

FIG. 5

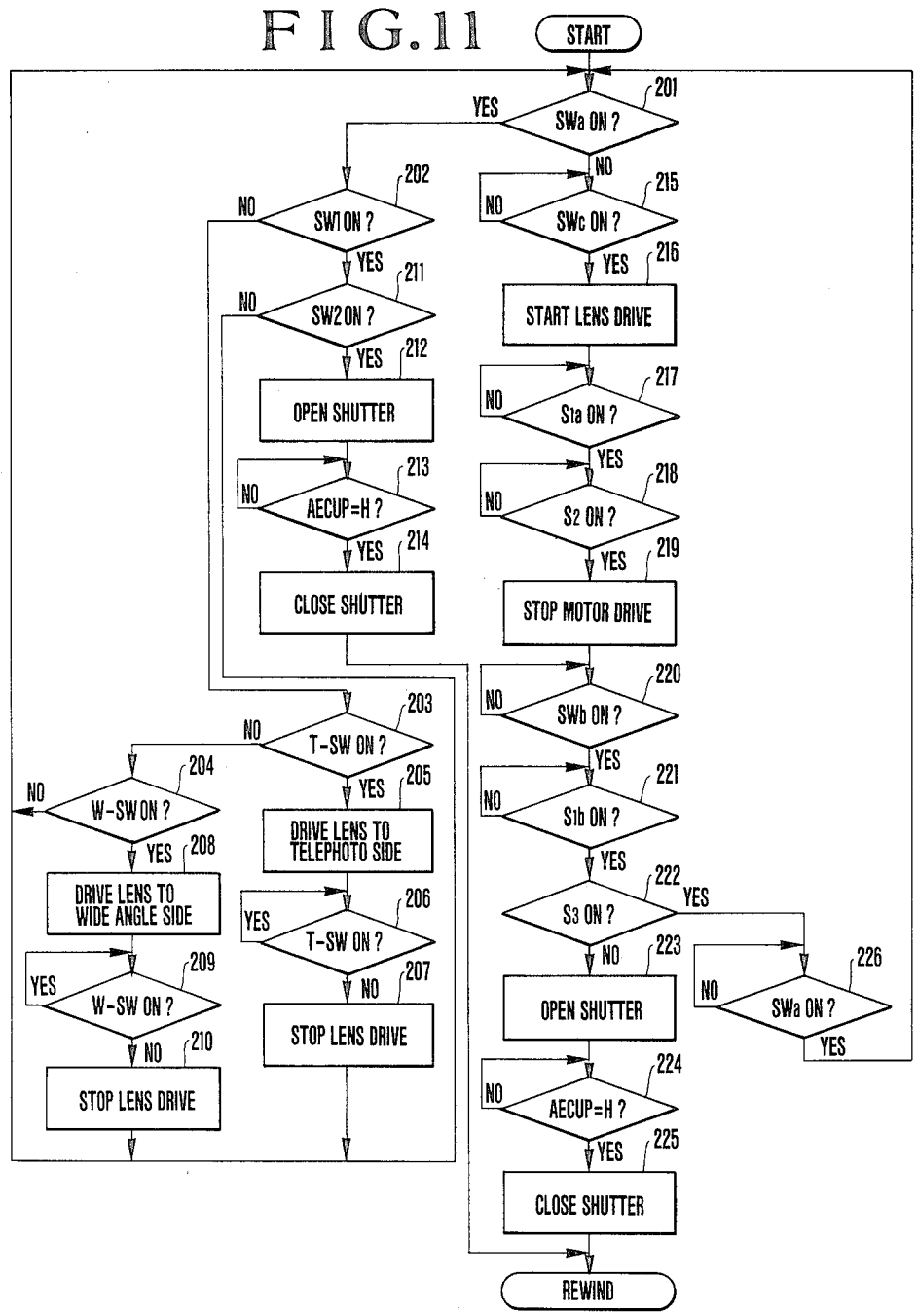

CONTROL DEVICE FOR EXPOSURE-WITH-ZOOMING PHOTOGRAPHY

BACKGROUND OF THE INVENTION

1. Field of the Invention

This invention relates to cameras having focal length variable optical system, particularly zoom lenses with automatic operating means therefor, and more particularly to improvements of the same.

2. Description of the Prior Art

The camera whose optical system is variable in focal length, particularly under zoom control, may be shot in such a fashion that an exposure is being made in accompaniment with zooming from one side to the other. In the thus-taken photograph, the image looks like flowing radiately from the center of the area of the picture format. To get such an imaging effect, it is essential that the alignment of the camera to the target area be steadily held during the shooting. With the prior known camera, however, because of its having a manual operating mechanism for the zoom lens, the photographer has to co-ordinate the shutter with the zoom lens in such a way that, for example, the shutter button is pushed down by his right hand, while simultaneously the zoom ring is manipulated by his left hand. This often led to a hand shake. Another prerequisite is that the initiation of an exposure operation and the start and speed of zooming movement are brought into good timing. This skill is very difficult to acquire.

SUMMARY OF THE INVENTION

With the foregoing in mind, the present invention has been made, and its first object is to eliminate the above-described problems and to provide a camera having an exposure-with-zooming mode which enables even the beginner to shoot a radiating picture without failure.

To achieve this object, according to the present invention, the camera having a zoom lens is provided with an exposure-with-zooming actuator knob adapted to initiate a zooming operation, operating means responsive to movement of the actuator knob for zooming the zoom lens, and control means for initiating an exposure operation in response to start of zooming, whereby the zooming and the releasing are simultaneously started by operating only the exposure-with-zooming actuator knob.

BRIEF DESCRIPTION OF THE DRAWINGS

FIG. 2 is a top plan view of the internal mechanisms of the camera.

FIG. 5 is an electrical circuit diagram of the camera.

FIG. 11 is a flow chart.

DETAILED DESCRIPTION OF THE PREFERRED EMBODIMENTS

Figure 1A:
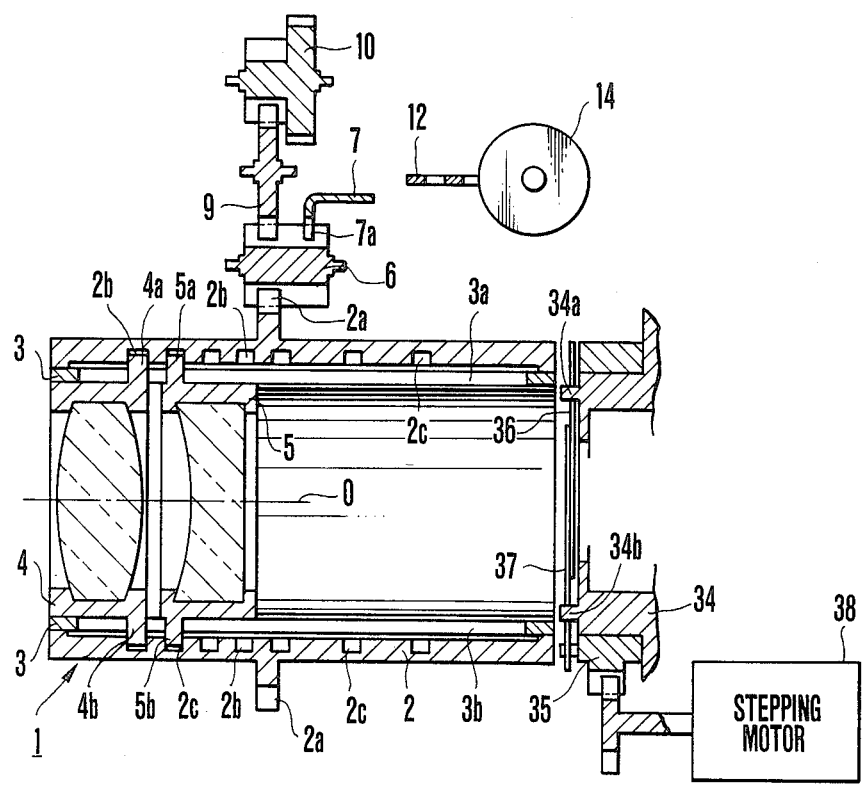
FIGS. 1A and 1B are respectively side sectional and front elevational views of the lens mounting mechanism of an embodiment of a camera according to the present invention.
Figure 1B:
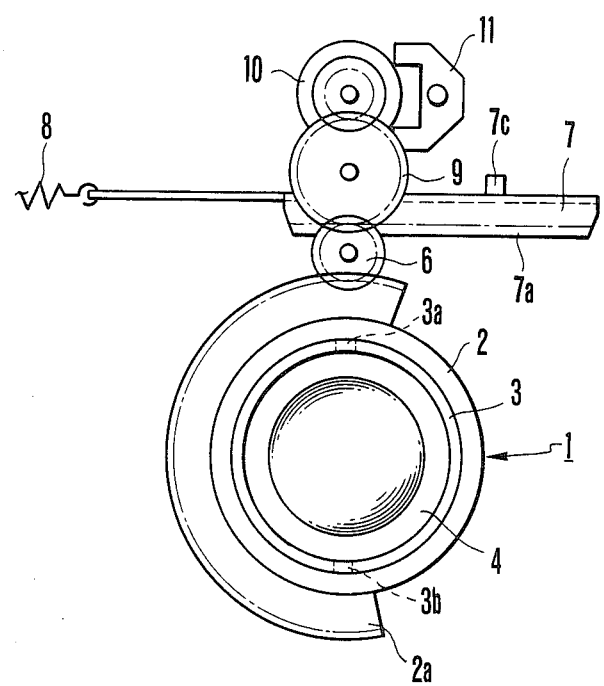
Figure 3A:
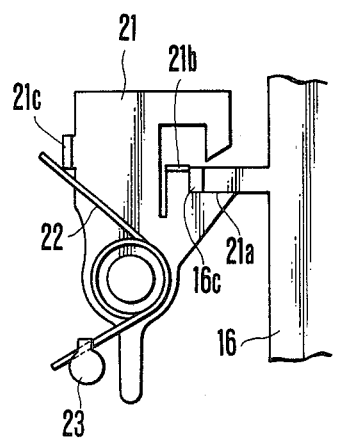
FIGS. 3A and 3B are respectively front and side elevational views of the lock for the mode selection slider.
Figure 3B:
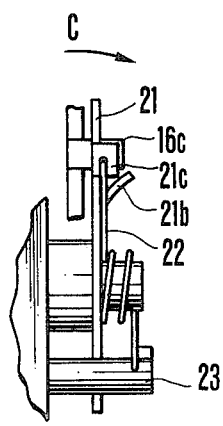

The present invention is next described in connection with an embodiment thereof by reference to the drawings.

Referring to FIGS. 1A to 4B, an operating mechanism for the zoom lens is generally indicated at 1, comprising a cam tube 2 rotatably mounted to a camera housing (not shown), and having a geared flange 2a on the outer surface thereof, in the inner surface of which are formed camming grooves 2b and 2c of different pitch to helical shape, and a guide tube 3 having axially elongated slots 3a and 3b through which pins 4a and 4b from a convex lens cell 4 extend into the camming grooves 2b respectively, and pins 5a and 5b from a concave lens cell 5 also extend into the camming grooves 2c respectively. When the cam tube turns about its axis, the convex and concave lens cells 4 and 5 are axially moved in differential relation. The zoom cam tube 2 is drivenly connected through a gear 6 meshing with the gear 2a to a drrve plate 7 (see FIGS. 1B and 2) which has a racked portion 7a meshing with the gear 6, an upward extension 7b for engagement with a latch lever 25, and a pin 7c. A spring 8 urges the slide plate 7 in a direction of arrow A in FIG. 2. An idler gear 9, an escape wheel 10 and an anchor 11 constitute a speed governor for the gear 6. A change slide plate 12 has longitudinally elongated slots 12a and 12b into which respective guide pins 13a and 13b extend from the camera housing, an armed portion 12c for the pin 7c, and upward extension 12d and a sideward extension 12e. A charge cam cylinder 14 has a camming groove 14a into which the extension 12e of the slide plate 12 extends so that when the cylinder 14 rotates one revolution, the slide 12 moves first to the left and then to the right. An electric motor 15 is drivingly connected through a gear train (see FIG. 2) to the cylinder 14.

A mode selector knob (not shown) is connected to a slide 16 having longitudinally elongated slots 16a and 16b with guide pins 17a and 17b therein respectively. A spring 18 urges the slide 16 downward as viewed in FIG. 2 (in the opposite direction to that of arrow B). A forked slider 19 fixedly carried on the slide plate 16 constitutes switches SWa, SWb and SWc together with patterns, a, b and c, on a substrate 20 respectively. For note, another pattern d is grounded. A lock plate 21 is pivotally, tiltably (in a direction of arrow C in FIG. 3B) mounted to the camera housing, and has an abutment 21a for the upward extension 16c of the mode selection plate 16, a bent portion 21b arranged to allow for movement of the slide 16 in the opposite direction to that of arrow B, and an upward extension 21c (see FIGS. 3A and 3B). A torsion spring 22 urges the lock plate 21 both in a clockwise direction and in a direction against the tilting. A stopper 23 limits the clockwise movement of the lock plate 21. Another stopper 24 limits the downward movement of the mode selector slide 16. A latch lever 25 for the slide plate 7 has an inclined edge 25a which can contact with the upward extension 7b a pawled portion 25b which can engage the upward extension 7b, and an upward extension 25c abutting on the end of the mode selector slide plate 16 under the action of a spring 26. 27 is a stopper. A release slide plate 28 moves as guided by guide pins 29a and 29b engaging in longitudinally elongated slots 28a and 28b, when an exposure-with-zooming release knob (not shown) is operated. A forked slider 30 fixedly carried on the release plate 28 constitutes a switch S3 together with patterns, e and f, on a substrate 31, the pattern f being grounded. 32 is a stopper. A spring 33 urges the release plate 28 downward as viewed in FIG. 2. A switch S1 has two fixed contacts S1a and S1b and a common movable contact which extends into the path of movement of the drive plate 7, so that when the drive plate 7 is in the leftmost position, the switch S1a is closed, and soon after it starts to move from that position to the right, the switch S1a is opened and the switch S1b is closed. Another switch S2 is arranged to be closed when the charge slide plate 12 is in the rightmost position because its movable contact is pushed by the upward extension 12d.

Figure 4A:
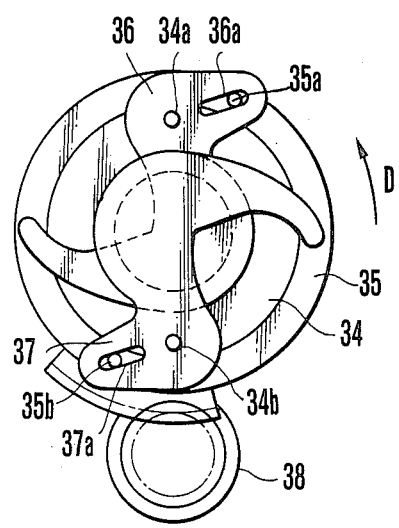
FIGS. 4A and 4B are front elevational views of the shutter in the closing and opening positions respectively.
Figure 4B:
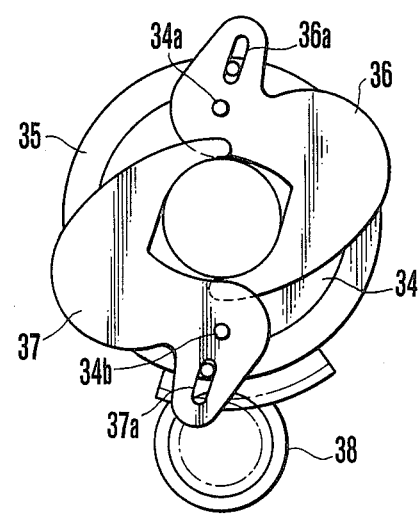
Figure 6:
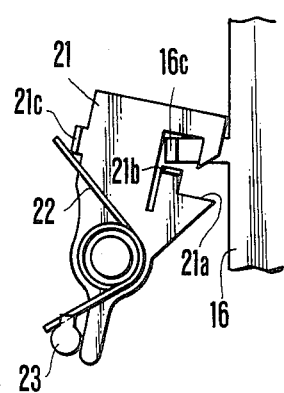
FIGS. 6 and 7 are front elevational views illustrating successive operative positions of the lock and mode selector.
Figure 7:
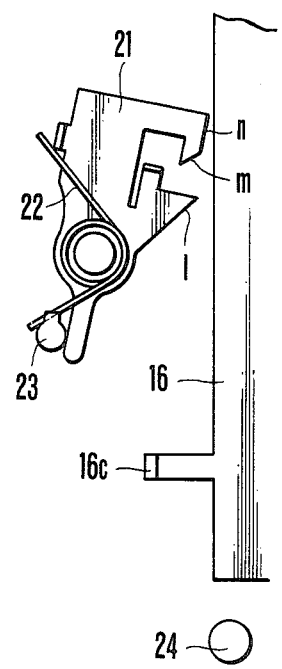
Figure 8:
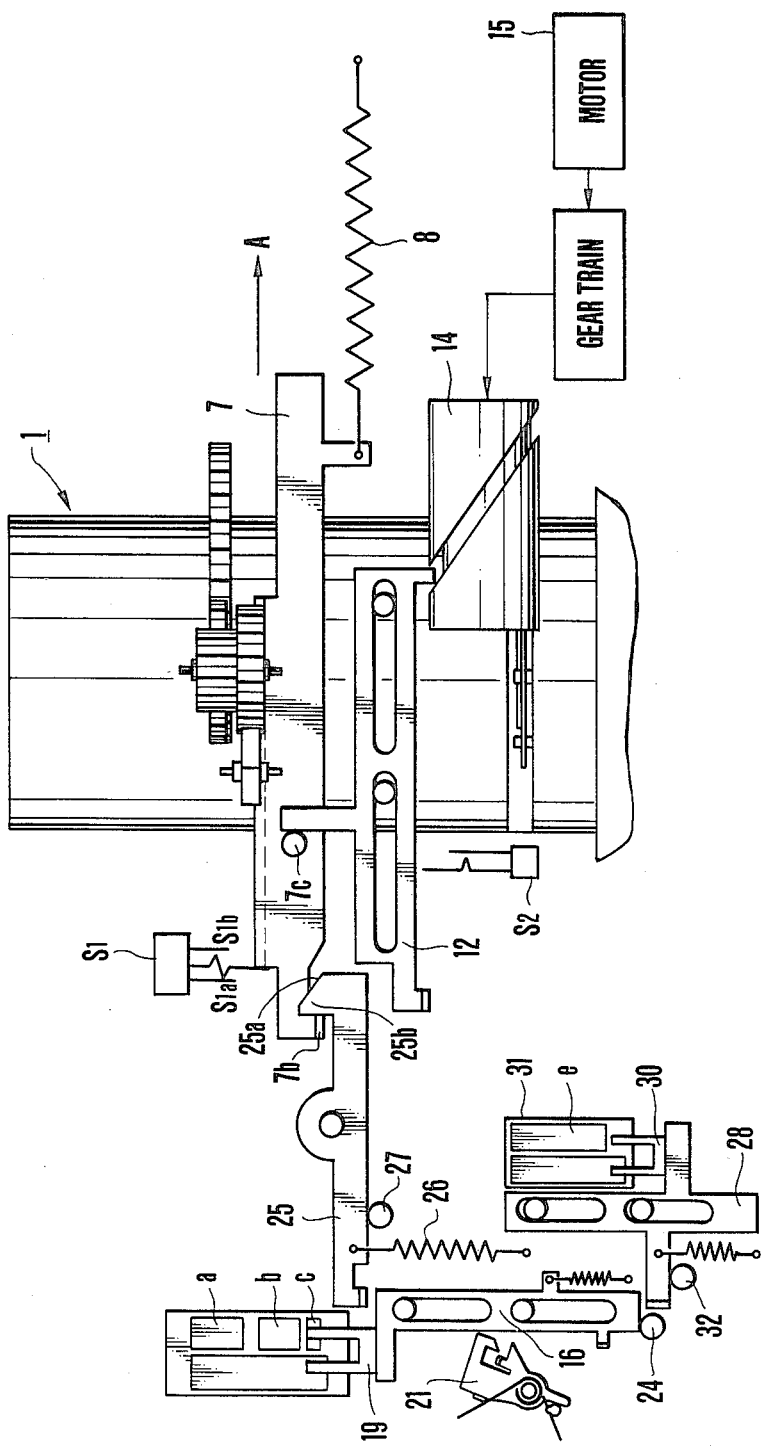
FIG. 8 is similar to FIG. 2 except that the camera is switched to the exposure-with-zooming mode where the zoom lens is moved to the telephoto side.
Figure 9:
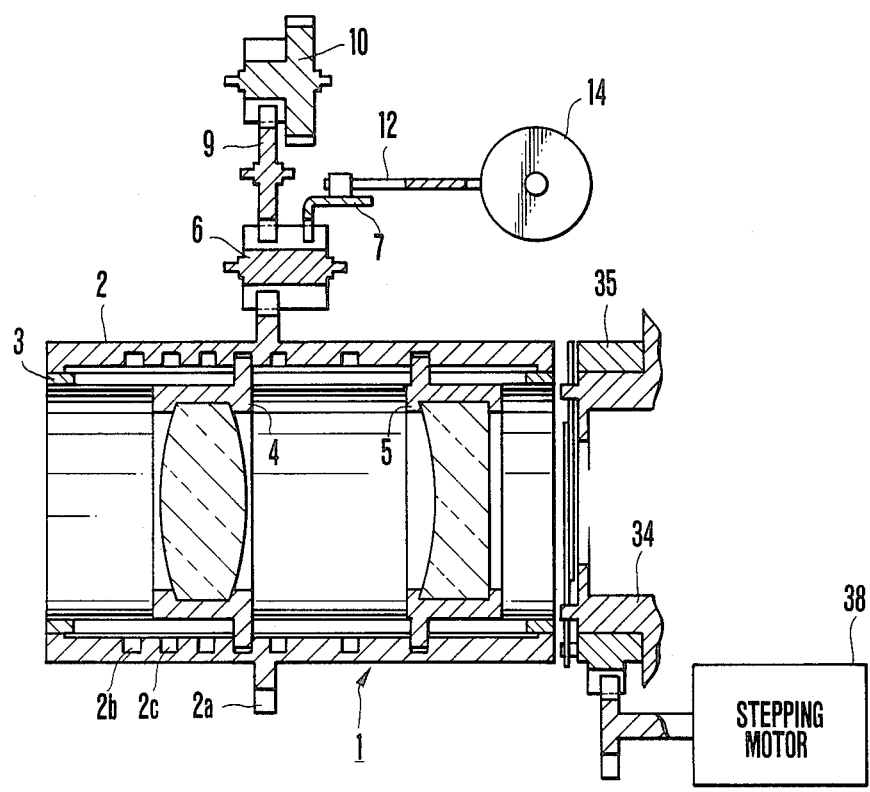
FIG. 9 is a side sectional view of the lens mounting in the telephoto setting.
Figure 10:
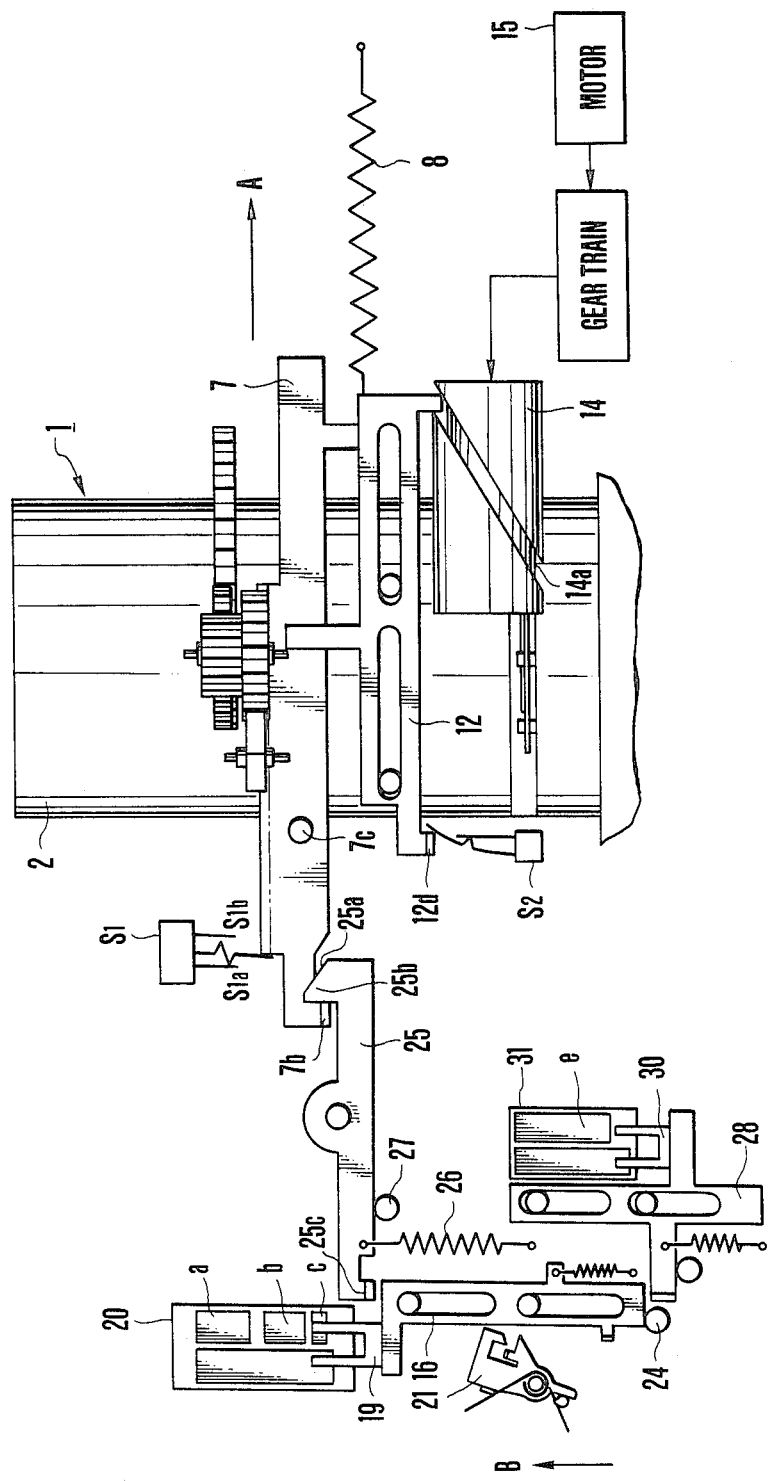
FIG. 10 is similar to FIG. 8, except that the exposure-with-zooming mode is readied to operate.

Referring to FIGS. 1A, 4A and 4B, an operating mechanism for the shutter comprises a base ring 34 fixedly mounted to the camera housing, a drive ring 35 rotatably fitted on the outer diameter of the base ring 34, and drivingly connected to two blades 36 and 37 through drive connection pins 35a and 35b engaging in elongated slots 36a and 37a respectively, so that when the ring 35 rotates in a direction of arrow D from the position of FIG. A, the blades 36 and 37 are turned about respective pivot pins 34a and 34b on the base ring 34 to open an exposure aperture as shown in FIG. 4B, and a stepping motor 38 drivingly connected to the ring 35 so that as the ring 35 rotates in a clockwise or counterclockwise direction, the shutter (comprised of the parts 34 to 37) opens or closes.

Figure 5:
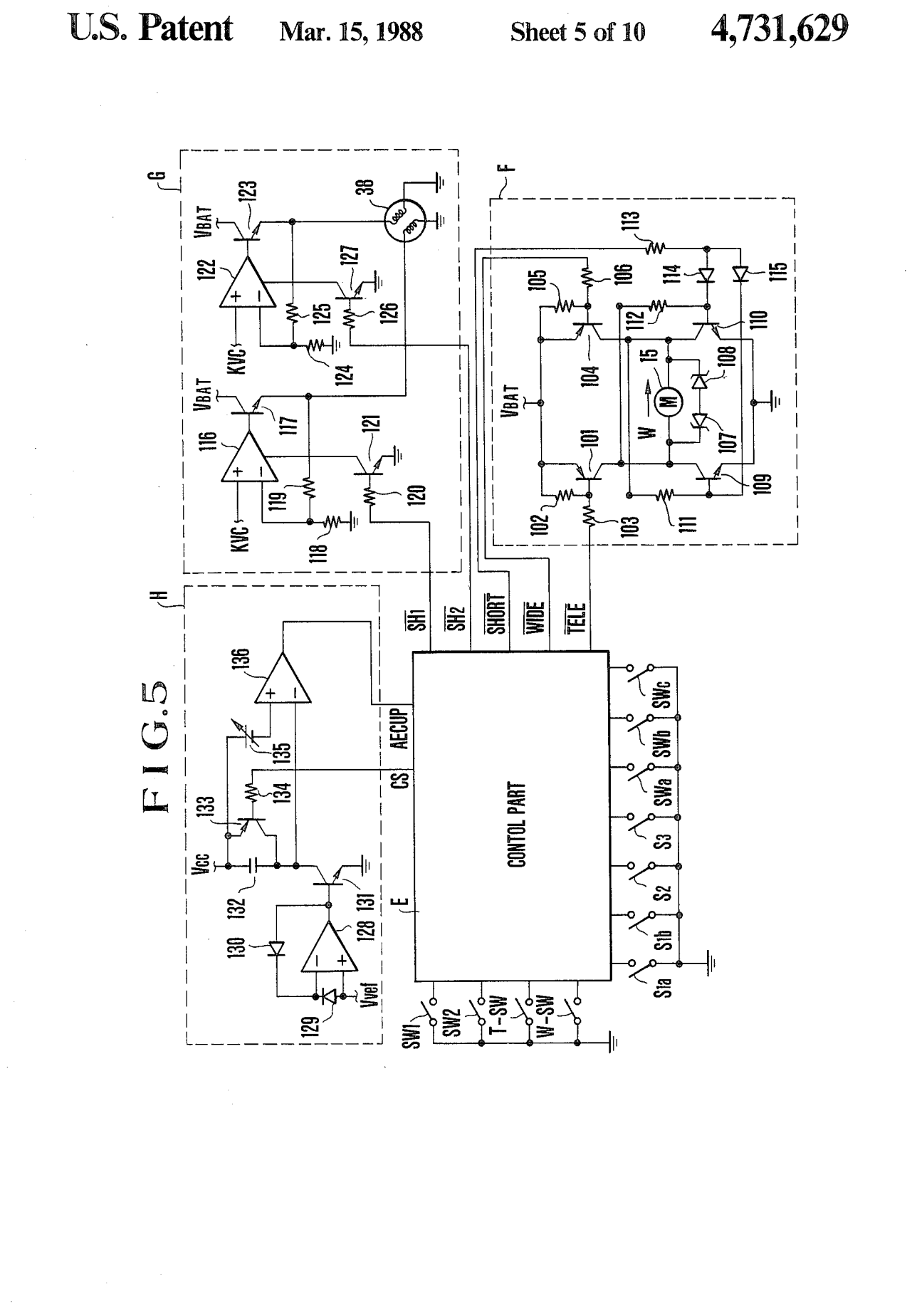

In the circuit of FIG. 5, a block E for controlling the co-ordination of the various parts of the camera has input ports connected to the outputs of switches SW1 and SW2 arranged to turn on when a release button is pushed down to first and second strokes respectively, telephoto and wide switches T-SW and W-SW arranged to turn on when the zoom lens is set in the telephoto or wide angle sides by a selector button (not shown) respectively, and the above-described switches S1a, S1b, S2, S3 and SWa to SWc. A drive circuit for the motor 15 in a block F is constructed with a transistor 101, resistors 102 and 103, another transistor 104, resistors 105 and 106, Zener diodes 107 and 108, transistors 109 and 110, resistors 111 to 113, and diodes 114 and 115. Another drive circuit for the stepping motor 38 in a block G is constructed with an operational amplifier 116, a transistor 117, resistors 118 to 120, a transistor 121, an operational amplifier 122, a transistor 123, resistors 124 to 126 and a transistor 127. An exposure control circuit in a block H is constructed with an operational amplifier 128, a photo sensor 129, a compression diode 130, an expaanding transistor 131, a timing capacitor 132 for determining the opening time of the shutter, a count start control transistor 133, a resistor 134, a constant voltage source 135, and a comparator 136.

The operation of the camera is explained below by using FIGS. 6 to 10 and the flow chart of FIG. 11. Let us first describe the ordinary shooting mode. The control part E first examines which mode, the ordinary or the exposure-with-zooming, has been selected by sensing the state of the switch SWa. If the switch SWa is ON, the ordinary shooting mode, if OFF, the exposure-with-zooming mode, is determined to have been selected (step 201 in FIG. 11). In the case of the ordinary shooting mode, because the mode selector knob was not operated, the mode changeover slide plate 16 is left in the position of FIG. 2 by the lock plate 21, as the upward extension 16c rests on the abutment 21a in cooperation with the side edge of the bent portion 21b. Therefore, the slider 19 is in contact with the pattern, a, (the switch SWa is ON). Thus, the selection of the ordinary shooting mode is detected. Such locking of the slide 16 also causes the upward extension 25c of the latch lever 25 to be pushed upward in the direction of arrow B against the bias force of the spring 26, thereby the pawl 25b is retracted from the path of movement of the drive slide plate 7. Then, whether or not the switch SW1 is ON is examined (in step 202). If not, the flow advances to step 203 where whether or not the telephoto switch T-SW is ON is examined. If not, whether or not the wide switch W-SW is ON is then examined in step 204. Now assuming that the tele switch T-SW is ON, the control part E produces a telephoto signal $\overline{\text{TELE}}$ of low level which is then applied to the motor drive circuit F. Responsive to this signal, the tranistor 101 turns on itself with the help of the resistors 102 and 103, energizing the motor 15 to rotate in a direction to move the zoom lens to the telephoto side (step 205). That is, when that transistor 101 turns on, its collector current flows through the resistor 112 to the base of the transistor 110, thereby the transistor 110 also is turned on. The motor 15 is then supplied with current flowing in a direction of arrow W (see FIG. 5), starting to rotate. Because the driving torque of the motor 15 is transmitted through the gear train (shown in FIG. 2) to the charge cam cylinder 14, it starts to rotate. Rotation of the cylinder 14 is transmitted through the connection of the camming groove 14a with the extension 12e to leftward movement of the charge slide plate 12 as viewed in FIG. 2, by which the drive plate 7 is moved with its pin 7c in engagement with the extension 12c. Because the drive plate 7 has the rack 7a on the lower surface thereof, as it moves leftward, the zoom cam tube 2 is rotated, moving the convex and concave lens cells 4 and 5 to the telephoto side. In a time after the start of movemen, the state of the switch T-Sw is examined again (step 206). For its continues being ON, such procedure repeats itself. When it then turns off, the telephoto signal $\overline{\text{TELE}}$ to the motor drive circuit F is changed to high level, and, at the same tie, a stop signal SHORT of high level for the motor 15 is produced for a prescribed time. Thereby, the bases of the transistors 109 and 110 are supplied with equal current through the resistor 113 and the diodes 114 and 115. As both ends of the winding of the motor 15 are short-circuited, the movement of the zoom lens 4, 5 to the telephoto setting is completely stopped (step 207).

Meanwhile, as the photographer desires the wide angle setting, when the wide switch W-SW is determined to be ON, the motor 15 is supplied with current flowing in the opposite direction to that of arrow W (see FIG. 5). So the motor 15 rotates in the opposite direction to that in the aforesaid case, moving the zoom lens to the wide angle setting (steps 204 and 208 to 210).

After the zoom lens has thus been set, the photographer will then release the camera. For actuation of such a camera release (the first and second strokes of depression of the release button), as the switches SW1 and SW2 are determined to be ON (steps 202 and 211 respectively), the control circuit E produces a pair of shutter control signals $\overline{SH1}$ and $\overline{SH2}$ which change between high and low levels in a prescribed phase relation repeatedly. Responsive to these signals, the transistors 121 and 127 turn on and off repeatedly, causing a first drive circuit of the parts 116 to 119 and a second drive circuit of the parts 122 to 125 respectively, to drive rotation of the stepping motor 38 in a direction to open the shutter. That is, when the stepping motor 38 rotates, the blade drive ring 35 rotates in the direction of arrow D, thereby the shutter blades 36 and 37 are moved from their position of FIG. 4A to their position of FIG. 4B (step 212). At the same time when the shutter starts to open, the control circuit E gives the count start signal CS of high level to the exposure control circuit H. The transistor 133 which has so far been conducting to bypass the timing capacitor 132 is rendered nonconducting, thereby charging of the timing capacitor 132 with current generated in the light sensor 129 is started. When the voltage stored on the timing capacitor 132 reaches a threshold level, the output of the comparator 136, or the signal AECUP, changes from low to high level. For such change of the signal AECUP, the control circuit E determines that the exposure time has expired (step 213), and produces the shutter control signals $\overline{SH1}$ and $\overline{SH2}$ in the opposite phase relation to that described above. Responsive to these signal, the drive cirucit G rotates the stepping motor 38 in the reversed direction, thereby the shutter is closed (step 214). And, when the closing operation of the shutter has completely terminated, the sequence transits to a film winding operation.

Next explanation is given to the exposure-with-zooming mode. The mode changeover plate 16 is moved in the direction of arrow B from the position of FIG. 2 by the mode selector knob (not shown) until the extension 16c clears out of the way of the bent portion 21b of the lock plate 21, thereupon the lock plate 21 is turned in the clockwise direction by the bias force of the torsion spring 22 until its tail abuts on the stopper 23, taking the position of FIG. 6. The photographer then needs to remove his finger from pushing the mode selector knob. Now, the mode changeover slide plate 16 is put under the action of the spring 18. Therefore, it starts to move in the reverse direction to that of arrow B. Soon after that, the extension 16c runs over the bent portion 21b of the lock plate 21, for the lock plate 21 can tilt in the direction of arrow C (to the right in FIG. 3B) against the bias force of the torsion spring 22 and further moves downward until its lower end abuts on the stopper 24 (see FIG. 7). Such downward movement of the mode changeover slide plate 16 permits counterclockwise movement of the latch lever 25 by the bias force of the spring 26 until its side edge abuts on the stopper 27.

When the mode changeover slide plate 16 reaches the lower terminal end of movement, the slider 19 rides the pattern, c, as has been moved away from the pattern, a. Determining that the switch SWa is OFF and the switch SWc is ON (in steps 201 and 215), the control circuit E produces the telephoto signal $\overline{TELE}$ of low level which is applied to the motor drive circuit F. Thereby, similarly to the above, the motor 15 starts to rotate. Its driving torque is transmitted to the charge cam cylinder 14, moving the charge plate 12 and drive plate 7 in unison to the opposite direction to that of arrow A. Since, at this time, as has been described above, the latch lever 25 assumes the counterclockwise most position with the bias force of the spring 26, the upward 7b of the drive plate 7 first strikes the incliend edge 25a of the latch lever 25 and then further moves to the left while slightly turning the latch lever 25 in the clockwise direction, until it enters inside the pawl 25b (see FIG. 8). At this time, the zoom lens 4, 5 is set in the telephoto position of FIG. 9. Also, the switch S1a is turned on where the upward extension 7b runs over the inclined edge 25a. After that, the motor 15 further rotates in the same direction, causing the charge plate 12 alone to start moving backward or, for now, in the direction of arrow A as is guided by the camming groove 14a of the charge cam cylinder 14. In the early stage of this backward movement, the upward extension 7b of the drive plate 7 engages the pawl 25b of the latch lever 25. When it reaches the terminal end of backward movement, the switch S2 is turned on by the upward extension 12b (see FIG. 10). Detecting that the switch S1a was turned on as has been described above, and this has been followed by the closure of the switch S2 (in the steps 217 and 218), the control circuit E changes the telephoto signal $\overline{TELE}$ of high level and also produces the stop signal SHORT for the prescribed time to stop rotation of the motor 15 (step 219).

The camera is now readied for shooting in the expoure-with-zooming mode. In this case the mode selector knob is used again for actuating a camera release. As the mode changeover plate 16 is again moved in the direction of arrow B from the position of FIG. 10 by the knob at a time when the slider 19 rides the pattern b, or the switch SWb turns on, the exposure control circuit H is changeover plate 1 rendered operative upon further movement of the mode in he same direction of arrow B, its front end strikes the head 25c of the latch lever 25 and turns the latter in the clockwise direction to the position of FIG. 2 again. Thereby, the drive plate 7 is released from the latching starting to move in the direction of arrow A by the power of the spring 8. Such movement of the drive plate 7 is transmitted through the gear 6 to rotate the zoom cam tube 2. Thus, the zoom lens is being moved from the telephoto side.

Soon after the start of movement of the drive plate 7 to the directio of arrow A, the switch S1b turns on. Detecting that the switch SWb turned on as has been described above, and is has been followed by the closure of the switch S1b (steps 220 and 221), the control circuit E then examines the state of the switch S3 (step 222). If the switch S3 is determined to be OFF, the control circuit E immediately produces the control signals $\overline{SH1}$ and $\overline{SH2}$ for the shutter drive circuit G, opening the shutter (step 223). At the same time, the exposure control circuit H is given the count start signal CS. Thus, an exposure and a zooming are initiated simultaneously. It should be recognized that, for an excellent image radiating result is attained, a desireable shutter program is such that the exposure time and the zomming time frm the telphoto to the wide angle side are equalized. At the termination of duration of the exposure time, responsive to the signal AECUP of high level from the exposure control cirucit H (step 224), the control circuit E produces the control signals $\overline{SH1}$ and $\overline{SH2}$ of different phase from that when the shutter was opened, closing the shutter (step 225).

As the mode changeover plate 16 proceeds to move in the direction of arrow B, its extension 16c comes first to slide over the tapered portion, of the lock plate 21 (see FIG. 7) while turning it in the counterclockwise direction against the bias force of the torsion spring 22, and then over the second tapered portion, m, and the flat portion, n, successively. When the lower ends of the slots 16a and 16b abut on the pins 17a and 17b, the photographer will remove his finger from pushing the mode selector knob. The mode changeover plate 16 is then slightly moved downward, or in the reversed direction to that of arrow B by the bias force of the spring 18 until the extension 16c rests on the aubtment 21a, since the plain and taper portions, n and m, inhibits the bent portion 21b from entering the path of movement of the extension 16c. For the lock plate 21 and mode changeover plate 16 regain the relative position of FIG. 3A, the camera is switched back to the ordinary shooting mode.

Meanwhile, to release the exposure-with-zooming mode, a release knob (not shown) is manipulated. When the release plate 28 is moved upward or in the direction of arrow B from the position of FIG. 2 by the release knob, the slider 30 rides the pattern, e. So, the switch S3 is determined to be ON (step 222) by the control circuit E, thereby the shutter is prohibited from opening. Such upward movement of the release plate 28 also causes the mode changeover plate 16 to move in the same direction of arrow B in engagement with the extension 28c. Then the switch SWa turns on (step 226). Finally, the position of FIG. 2, that is, the ordinary shooting mode is regained.

According to the embodiment of the invention, in order to operate the exposure-with-zooming mode, the photographer needs only to move the mode changeover plate 16 in the direction of arrow B so that the drive plate 7 is released from the locking connection with the latch lever 25, thereby it being made possible even for the beginner to get photographs of adequate exposure-with-zooming effect, since the holding of the camera can be stabilized against hand-shakes, and a good timing of releasing with zooming is insured.

In the illustrated embodiment of the invention, the mode changeover plate 16 to the stopper 27 except the pins 17a and 17b constitute an operating mechanism for the exposure-with-zooming mode of the invention. The zoom cam tube 2, the guide tube 3, the drive gear 6, the drive plate 7 and the spring 8 constitutes an automatic operating mechanism for the zoom lens. The control parts E corresponds to co-ordination control means.

Though the foregoing embodiment has been described in connection with the use of the motor 15 for setting the zoom lens on the telephoto side by the drive plate 7, it is to be understood that the present invention is not confined thereto. Variations may be made, for example, by manually setting the zoom lens on the telephoto side, while charging the drive plate 7 to the position of FIG. 10. Instead of using the spring 8 as the power source for the drive plate 7 it is also possible to use an electric motor. The present invention is also applicable to another type of camera whose focal length varies not continuously but in discrete values.

As has been described above, the present invention is to provide for the camera whose objective is variable in focal length with an actuator for initiating an automatic zooming, drive means responsive to movement of the actuator for zooming the objective and control means responsive to initiation of the zooming operation for initiating an exposure operation to the photographic film, whereby the manipulation of the single actuator suffices for performing the making of an exposure and the zooming of the objective concurrently, giving an advantage that even the beginner can shoot excellent radiating pictures without failure.

What is claimed is:

1. A control device for exposure-with-zooming photography, comprising:
    (a) a focal length variable photographic optical system;
    (b) drive means for varying the focal length of said photographic optical system;
    (c) exposure means for performing an exposure operation; and
    (d) operating means for rendering operative said drive means and said exposure means simultaneously.

2. A device according to claim 1, wherein said focal length variable photographic optical system includes a zoom optical system.

3. A device according to claim 1, wherein said drive means includes bias means.

4. A device according to claim 3, further comprising charge means for charging said bias means in response to operation of said operating means.

5. A device according to claim 4, wherein said charge means includes motorized driving means.

6. A control device for exposure-with-variable magnification photogrpahy, comprising:
    (a) a focal length variable photographic optical system;
    (b) drive means for varying the focal length of said photographic optical system;
    (c) exposure means for performing an exposure operation;
    (d) operating means for rendering operative said drive means and said exposure means simultaneously; and
    (e) prohibition means for selectively prohibiting the operation of said operation means.

7. A device according to claim 6, wherein said focal length variable photographic optical system includes a zoom optical system.

8. A device according to claim 6, wherein said drive means includes bias means.

9. A control device according to claim 8, further comprising electric drive means for charging the bias means.

10. A control device according to claim 9, wherein said electric drive means includes means for driving the photographic optical system with variable magnification.

11. A control device for exposure-with-variable magnification photography, comprising:
    (a) drive means for varying a focal length of a photographic optical system;
    (b) exposure means for performing an exposure operation;
    (c) change-over means for changing over the drive means beween a first mode, in which said exposure means is made operative during the drive of the drive means, and a second mode, in which the drive of said drive means and the operation of said exposure means are performed independently from each other.

12. A control device according to claim 11, wherein said focal length variable photographic optical system includes a zoom optical system.

13. A device according to claim 11, wherein said drive means include bias means.

14. A control device according to claim 13, further comprising electric drive means for charging the bias means.

15. A control device according to claim 14, wherein said electric drive means includes means for driving the photographic optical system with variable magnification.

16. A control device for exposure-with-variable magnification photography, comprising:
   (a) drive means for varying a focal length of a photographic optical system;
   (b) exposure means for performing an exposure operation;
   (c) setting means for setting the drive means so as to cause the exposure means to operate during the drive of the drive means; and
   (d) release means for releasing the setting means.

17. A control device according to claim 16, wherein said focal length variable photographic optical system includes a zoom optical system.

18. A device according to claim 16, wherein said drive means includes bias means.

19. A control device according to claim 18, further comprising electric drive for chraging the bias means.

20. A control device according to claim 19, wherein said electric drive means includes means for driving the photographic optical system with variable magnification.

* * * * *